Feb. 7, 1928.

W. H. WINEMAN

VALVE GEAR

Filed July 8, 1924

Inventor:
Wade H. Wineman.
by
Attorney.

Patented Feb. 7, 1928.

1,658,318

UNITED STATES PATENT OFFICE.

WADE H. WINEMAN, OF MICHIGAN CITY, INDIANA, ASSIGNOR TO SULLIVAN MACHINERY COMPANY, A CORPORATION OF MASSACHUSETTS.

VALVE GEAR.

Application filed July 8, 1924. Serial No. 724,866.

My invention relates to valve gears and particularly to admission valve gears for fluid pressure motors.

An object of my invention is to provide an improved valve gear. Another object of my invention is to provide an improved valve gear in which friction and wear will be reduced to a minimum degree. A still further object of my invention is to provide an improved cam type valve gear in which wear will be reduced to a minimum. Yet a further object of my invention is to provide an improved cam valve gear of a type particularly adapted to be employed in expansible chamber motors in which variable periods of admission are desired and which will permit the variation in the period of admission to be accomplished by means of relatively movable cam and roller elements without difficulty due to excessive wear at any point upon the cam. Other objects and advantages of my invention will hereinafter more fully appear.

In the accompanying drawings I have shown for purposes of illustration one form which my invention may assume in practice.

In these drawings,—

Figure 1:
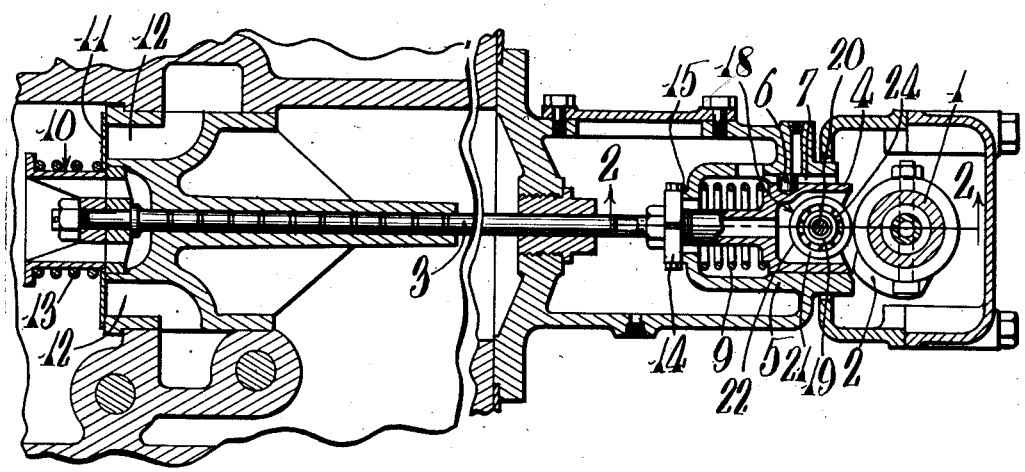
Fig. 1 is a central longitudinal section through a valve mechanism constructed in accordance with my invention.
Figure 2:
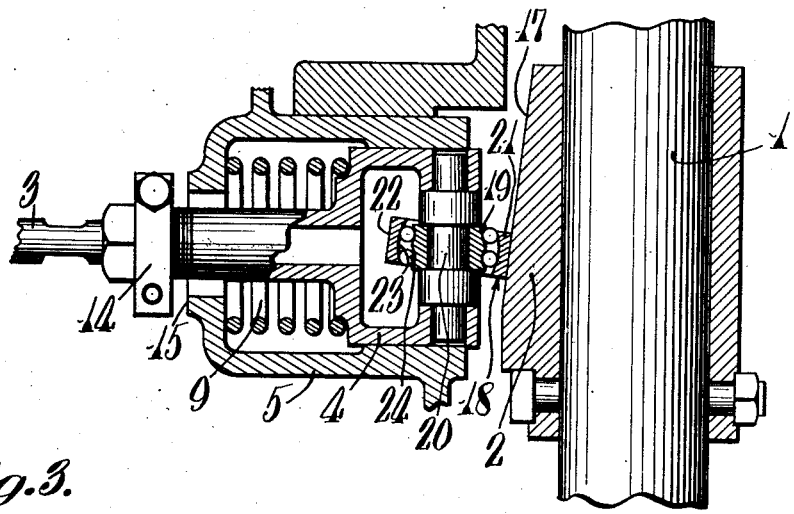
Fig. 2 is a horizontal section on the line 2—2 of Fig. 1.
Figure 3:
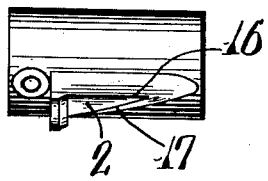
Fig. 3 is an elevation of the cam forming a portion of this mechanism.

My invention constitutes an improvement upon the mechanism shown in my prior application, now Patent No. 1,635,146, patented July 5, 1927. In the prior application there was shown a cam valve gear in which an admission valve is opened by means of a valve stem moved in opposite directions respectively by a spring and upon engagement with the roller of a rotating cam. In order to provide a variable period of admission, these cams are formed with relatively straight leading edges, while the following edges are disposed helically with respect to the cam shaft so that the cams proper are narrower at one end that at the other. In the ordinary operation of the engine, it will be obvious that there will be a relatively limited zone of contact between the roller and the cam and as a result the wear at that point will tend to increase to a substantial extent as compared with other places, and moreover, where the roller strikes the following edge there will be, due to the spiral disposition of this edge, only a relatively small area of contact between the roller and the cam at the instant when admission is terminated and as a result grooving at that point is apt to occur with a resultant variation in the cut-off and possible difficulty in shifting the cam. It is with a view to minimizing this difficulty that my present invention is made.

In the drawings there will be observed at 1 an axially shiftable cam shaft which carries a cam 2 which is rotatable with the shaft to effect longitudinal movements of a valve rod 3. At its end adjacent the cam shaft, the rod 3 carries a member marked 4 which carries the cam engaging element later described and which is reciprocable in a cage or guide member 5 and prevented from rotation by a pin in the guide engaging in a slot in the member 4, said pin and slot being illustrated at 6 and 7 respectively. A spring 9 engages the member 4 for the purpose of maintaining the valve stem 3 in position to keep the valve closed. At its opposite end, the valve stem 3 carries the valve mechanism proper which is generally designated 10 and which is herein shown as a single beat poppet valve, the valve proper being designated 11 and controlling admission ports 12 leading to the cylinder bore. In view of the resilient mounting of the valve 11 provided by the spring 13 it is possible to prevent the valve stem from causing a constant pressure upon the lower or inactive portions of the cam member; and a limiting member 14 engaging the shoulder 15 on the member 5 is so secured to the valve stem as, while permitting proper closing of the valve, to limit the movement of the valve stem toward the cam shaft in such manner as to preclude contact between the cam member and the roller which engages the same except immediately preceding, during, and immediately after admission. The cam 2, as pointed out above, is of the type having a leading edge herein indicated at 16 which is substantially parallel to the axis of the cam shaft, while the following edge 17 is helically disposed. For the purpose of minimizing wear and friction a self-alining bearing 18 is mounted with its inner race 19 upon a shaft 20 which extends transversely of the member 4, while its outer race 21 is formed with a cylindrical surface 22 which engages the surface of the cam. In view of the arcuate formation of the inner surface of the race 21 as indicated at 23, and the possible movement permitted thereby relative to the anti-friction balls 24, the race 21 is able to pivot about an axis perpendicular to the axis of the shaft 20 with the result that the surface 22 constantly maintains a line contact with the surface of the cam not only during opening and while the valve is open, but also as the valve is closed, the member 21 rotating with its outer surface coaxial with a line parallel to the cam shaft axis during opening of the valve and while the valve is open and then shifting as the valve closes to a position in which its axis makes an angle with the axis to the shaft 20, thereafter straightening up before admission occurs again. By virtue of this construction in which the exertion of a considerable pressure between a sharp corner and the following edge of the cam is largely eliminated, there is avoided grooving of the cam, and while smooth and nearly frictionless running is accomplished, much greater life and uniformity of operation over a long period is assured.

While I have in this application specifically described one form which my invention may assume in practice, it will be understood that this form of the same is shown for purposes of illustration and that the invention may be modified and embodied in other forms without departing from its spirit or the scope of the appended claims.

What I claim as new and desire to secure by Letters Patent is:

1. In an apparatus of the character described, a cam having a roller engaging surface, a portion of which is cylindrical and other portions of which deviate differently therefrom, and a roller engageable with said surface and having a support and between it and said support a self-alining ball bearing.

2. In apparatus of the character described, a cam having a surface a portion of which is cylindrical and other portions of which deviate therefrom, a roller engageable with said surface, and a support extending through said roller, the surface of the roller which engages said support being arc-shaped in the direction in which said support extends.

3. In combination, a roller cam follower and a mounting therefor including journal means supporting the follower for rotation on an axis extending transversely therethrough and for tilting on a plurality of axes intersecting said first mentioned axis.

In testimony whereof I affix my signature.

WADE H. WINEMAN.